Jan. 3, 1933.　　　　G. D. KINGSLAND　　　　1,893,238
CONTROL DEVICE
Filed July 24, 1931　　2 Sheets-Sheet 1
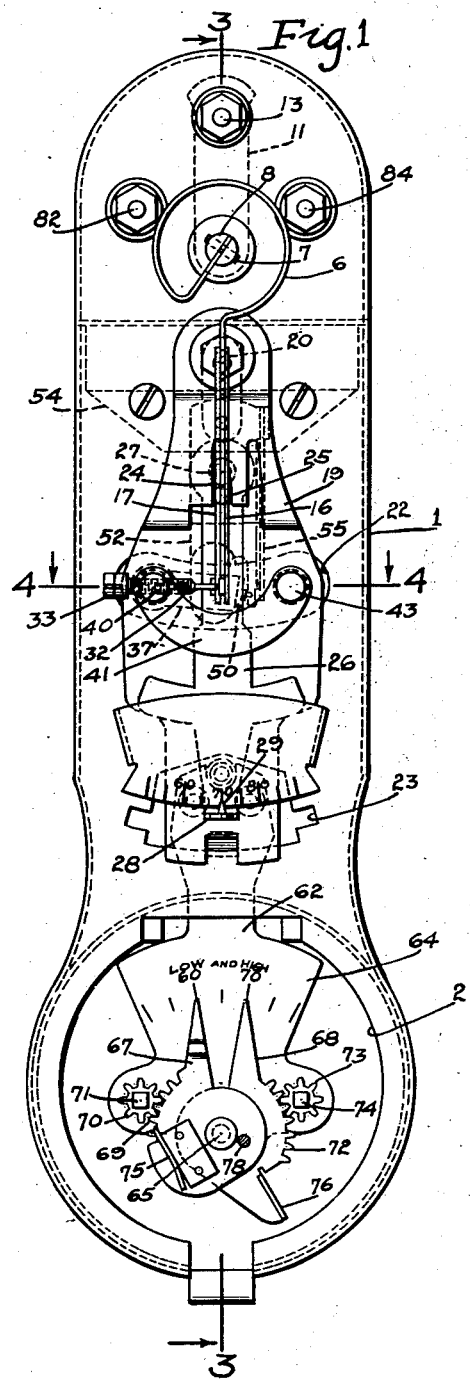
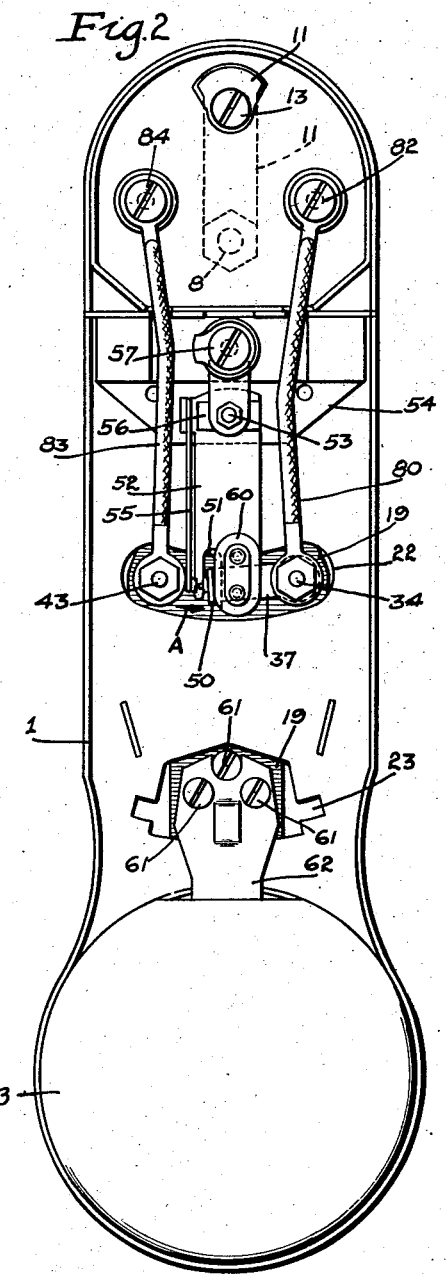
INVENTOR
GEORGE D. KINGSLAND
By
ATTORNEYS Jan. 3, 1933. G. D. KINGSLAND 1,893,238
CONTROL DEVICE
Filed July 24, 1931 2 Sheets-Sheet 2
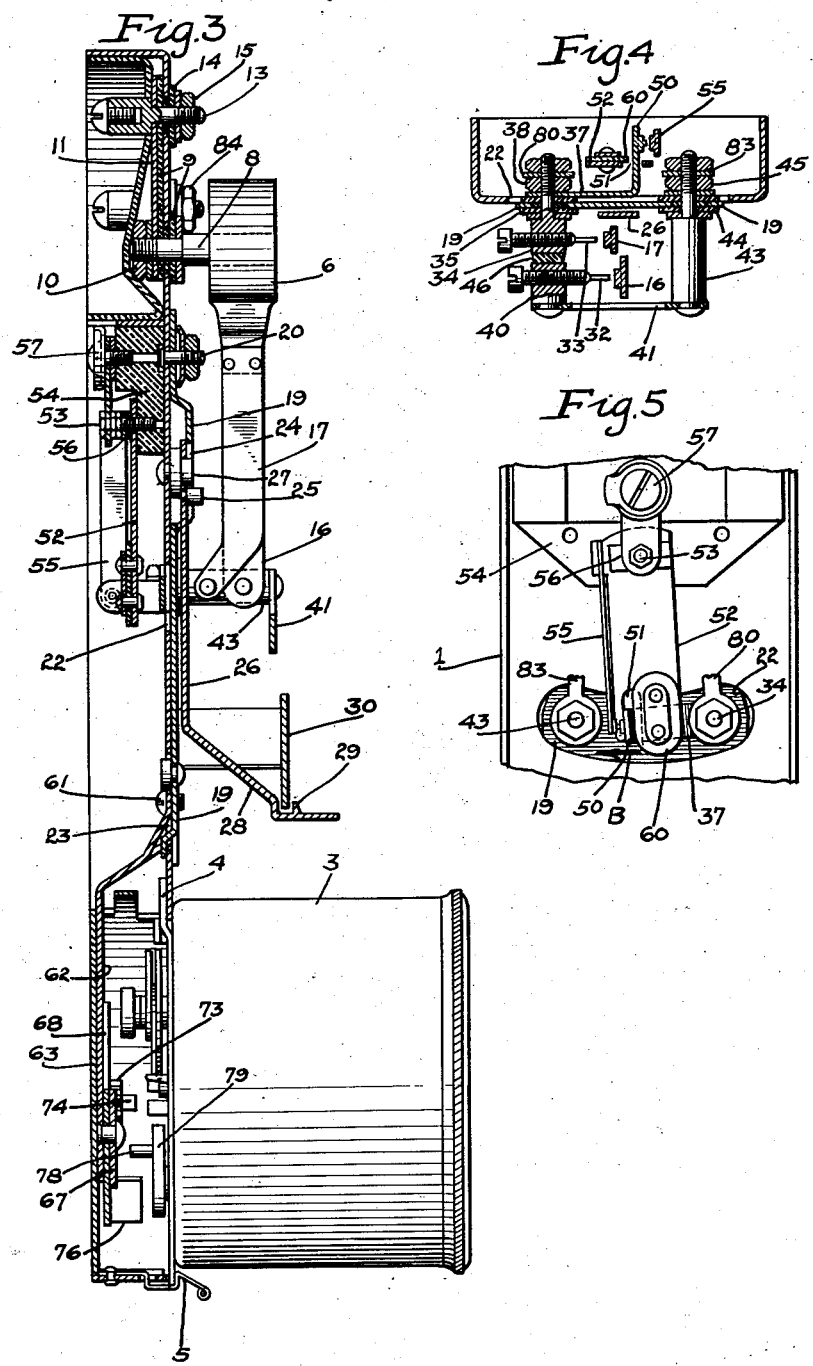
INVENTOR
GEORGE D. KINGSLAND
BY
ATTORNEYS Patented Jan. 3, 1933

1,893,238

UNITED STATES PATENT OFFICE

GEORGE D. KINGSLAND, OF MINNEAPOLIS, MINNESOTA, ASSIGNOR TO MINNEAPOLIS-HONEYWELL REGULATOR COMPANY, OF MINNEAPOLIS, MINNESOTA, A CORPORATION OF DELAWARE

CONTROL DEVICE

Application filed July 24, 1931. Serial No. 552,900.

This invention relates to improvements in instruments which are responsive to variations in physical conditions, and which are so constructed that they can be "calibrated" conformably to varying conditions of use, and which have means by which calibration can be accomplished.

The principle of the invention is herein applied to a thermostat, (or to a thermostatic switch) which has means for calibrating it, and in which this calibrating means is utilized to control other means.

Among the features of the invention, therefore, are: the utilization of calibration-adjusting means for operating some other means or controlling it; to utilize the calibrating means of a thermostat for controlling some other means; to utilize the calibration means of a thermostat for controling an auxiliary switch or switching means; to provide a room thermostat which has means for adjusting its contacts, and to utilize this means for controlling an auxiliary switch in some predetermined relation to the direction of calibration; and generally to provide a specific switch construction which is controlled by a specific thermostatic contact-adjusting means.

The specific embodiment of the invention herein disclosed finds valuable use in control of heating systems. Such a use is illustrated in my copending application for Heat regulating device, filed March 23, 1931, Serial Number 524,598. In this case, a room thermostat having means for adjusting its calibration, has means by which calibration adjustment is adapted to open or close the contacts of another switch, in some predetermined relation to calibration-adjustment.

Objects, features and advantages of the invention will be set forth in the description of the drawings forming a part of this application, and in said drawings Figure 1 is a front face view of a room thermostat showing my invention applied thereto;

Figure 2 is a rear face view of the device of Figure 1, with the auxiliary switch;

Figure 3 is a vertical section in line 3—3 of Figure 1 looking in the direction of the arrow and showing the clock in operative position, as a means for automatically adjusting the contacts or operating the calibrating means at predetermined intervals;

Figure 4 is a plan section on line 4—4 of Figure 1 illustrating a calibration adjustment of the thermostat contacts which has resulted in opening the auxiliary switch; and Figure 5 is a fragmentary rear face view illustrating a different calibration-adjustment of the thermostatic contacts which has resulted in closing the auxiliary switch.

In the drawings, a hollow base or mount is generally indicated at 1. The front wall of the base is provided with an opening 2 which is normally closed by clock casing 3. The clock casing is detachably secured in operative position by means of slip connection 4 and releasable latch connection 5. The clock mechanism provides means for automatically obtaining timed calibration-adjustments of the thermostat contacts.

Mounted on the front of the casing 1 is a spiral thermostatic element 6, suitably secured by one terminal as at 7 to a post 8, said post being suitably insulated from the plate as at 9 and held by nut 10. One of the insulating elements 9 is a strip which lies against the inner face of the front wall of the casing. Against this insulating strip is laid a conducting strip 11 connecting the post 8 with a binding post 13 which is suitably insulated as at 14 and held by nut 15. The thermostatic element 6 has attached thereto two flexible metal arms respectively indicated 16—17.

Each arm operates against a contact, below more fully described, and means is provided for adjusting these contacts toward or away from the arms 16—17 to vary the calibration. Other types of calibration-adjusting means may be used.

In this instance, both contacts are on the same side of the arms. The contacts are mounted on a plate 19 which is pivoted as at 20 to the front wall of the casing 1. This plate swings over openings in the front wall respectively indicated at 22—23. A suitable nut in threaded engagement with the pivot 20 compresses a friction washer to yieldably secure the plate 19 in an adjusted position. The plate 19 has a portion which is spaced from the front wall of the casing 1, and this portion is slotted as at 24. Engaged with the walls of this slot is a pin 25 carried by adjusting lever 26 pivoted as at 27 to the front wall of the casing, beneath the raised portion of plate 19, see Figures 1 and 3. The pivot 27 is spaced from the pivot 20 and lies between that pivot and the contact-making ends of the elements 16 and 17. The lever 26 is provided with a forward extension 28 having a pointer 29 which is opposed to a suitable scale of scale plate 30. The extension 28 has a suitable thumb piece by which it is moved. Whenever the lever 26 is moved, the plate is also moved in the same direction. Mounted on the plate 19, see Figure 4, are contacts 32—33 respectively engageable by arms 16—17. Contact 33 is in threaded engagement with post 34 which passes through the plate 19 and slot 22, and is suitably insulated from the plate as at 35. Electrically connected with this post 34, at the inside of the support, is an arm 37 of an auxiliary switch which is to be controlled, conformably to calibration adjustment of the contacts 32—33. This arm is held in operative relation by means of nut 38 which presses it against part of the insulation 35 and serves to secure the post as well as the arm 37 in operative position.

The contact 32 is in threaded engagement with post 40 which is supported by conducting arm 41. The opposite end of this arm is attached to a post 43 which is attached to the plate 19 from which it is suitably insulated as at 44. Nut 45 secures the post 43. Elements 34 and 40 are insulated from one another as at 46, see Figure 4.

The construction and arrangement of the auxiliary switch is best shown in Figures 2, 3 and 4. The arm 37 has a contact extension 50 which passes rearwardly loosely through a slot 51 in a plate 52. This plate is pivoted as at 53 to a block of insulating material 54 secured to the inner side of the base. A yieldable friction device 56 (see Figure 3) secures the plate in adjusted position. Part 53 is connected to binding post 57. To plate 52 is secured a flexible contact arm 55 adapted to be engaged by the contact extension 50 to close the circuit after plate 19 is moved slightly in a certain direction, for adjusting the calibration of the thermostat. In this instance, this closure takes place when contacts 32—33 are moved toward arms 16—17 in direction of arrow B, see Figure 5. This switch is adapted to be open when the element 50 has moved slightly in the opposite direction, see arrow A, Figure 2. After the switch is open, 50 engages a piece of insulation 60 (see Figure 2) carried by the plate 52 and moves the plate so that the contacts 50—55 are maintained in open circuit position during continued motion in the same direction.

After slight reverse motion of the element 50, the switch is closed and on continued motion, the support 52 is moved as a result of engagement of the arm 50 with the plate 52. A lost motion connection is thus provided between 50 and 52.

It is conceivable that by means of this invention, an auxiliary switch or a plurality of such switches may be made to move in some predetermined relation to direction of calibration, and although all the details of the specific device herein are claimed, there is no intention to limit the broader aspects of the invention which relate to the utilization of the calibrating means for operating other devices conformably to direction of calibration.

Attached to the arm 19 at its rear as at 61 and passing rearwardly through the opening 23 is a plate 62 (see Figure 3) which is bent to provide a portion which is slidable against a back plate 63 of the base 1. This plate 62 is broadened as at 64, see Figure 1, and has a scale. Pivoted to this broadened portion as at 65 are two plates 67—68 having pointers opposed to the scale as shown. Plate 67 is provided with gear teeth 69 meshing with an adjusting pinion 70 having a key projection 71 by which it is adjusted. The plate 68 has gear teeth 72 meshing with adjusting pinion 73 having the key projection 74. Plate 67 has an abutment 75 and plate 68 has an abutment 76. The abutments are opposed, and they can be adjustably spaced conformably to scale readings. These abutments are adapted to be alternatively engaged by a crank pin 78, see Figure 3, (also shown in section in Figure 1). The crank 79 is operated by the clock in any suitable manner.

When the crank arm moves the pin from the position shown in Figure 1 through an arc of 180 degrees, the pin engages the abutment 75 with a wiping action and moves the plate to the left to calibrate the instrument for closing action at a lower temperature. On continued rotation of the pin through another arc of 180 degrees, it engages the abutment 76 and calibrates the instrument for closing action at a higher temperature. During calibrating actions, the auxiliary switch, including the elements 50—55 is being controlled to open or close after a slight calibration motion in either direction, and the opened or closed condition is maintained if the calibrating action continues in the same direction.

By means of the clock, calibration is automatically accomplished at timed intervals. It will be noted that the crank pin 78 always stops at a position which permits a motion of the plate 64 and, therefore, abutments 75—76 without interference by the pin, so that this plate can be independently manually adjusted by means of the thumb piece of the extension 28.

The post 34 is connected by conductor 80 with post 82, and post 43 is connected by conductor 83 with post 84. The thermostatic element is connected by means of the plate 11 and post 8 with binding post 13.

Circuits can be traced from post 13, conductor 11, post 8, switch arm 16, contact 32, element 40, plate 41, post 43, conductor 83 to binding post 84. Also from 13, 11, 8, switch arm 17, contact 33, post 34, switch contact arm 37, extension 50, contact 55, plate 52, pivot 53, binding post 57. Also from 13, 11, 8, 17, 33, post 34, thence by conductor 80 to post 82.

I claim as my invention:

1. A device of the class described, comprising, in combination, a thermostatic element, switching means operated thereby, movable adjusting means associated with the thermostatic element and switching means for varying the temperature at which the latter is operated by the former, a second switching means, and a mechanical connection between the second switching means and adjusting means for moving the second switching means to a control position as a result of slight movement of the adjusting means and causing that control position to be maintained on continued movement of the adjusting means.

2. A device of the class described, comprising, in combination, a thermostatic element, switching means operated thereby, movable adjusting means associated with the thermostatic element and switching means for varying the temperature at which the latter is operated by the former, a second switching means, and a mechanical connection between the second switching means and adjusting means for moving the second switching means to a control position as a result of slight movement of the adjusting means in either direction, and causing that control position to be maintained on continued movement of the adjusting means in the same direction.

3. A device of the class described comprising a thermostatic switch and means for adjusting it, a secondary switch having an element independently movable with respect to the adjusting means and having another element movable with said adjusting means, and means establishing a lost motion connection between the switch elements in such manner that the element movable by the adjusting means is adapted on slight motion in one direction to close the switch and maintain such closure on continued motion in the same direction, and is adapted on slight adjusting motion in an opposite direction to open the switch and maintain the open position on continued motion in that direction.

4. A device of the class described comprising a thermostatic switch and means for adjusting it, a secondary switch including an element movable independently of the adjusting means, and another element movable by the adjusting means, and means establishing a lost motion connection between the elements in such manner that the element movable by the adjusting means is adapted on slight motion of said means in opposite directions to close or open the switch, and to maintain such open or closed condition on continued motion of the adjusting means in the corresponding direction.

5. A device of the class described comprising, a thermostat having a thermal element and contacts at one side thereof engageable thereby, means for adjusting the contacts relative to the thermal element, an auxiliary switch having a first contact movable by said adjusting means, a support having spaced stops and having a second contact of said auxiliary switch thereon, said first contact being arranged to alternately engage said stops and correspondingly move the support in reverse directions and to control the contacts during such motion.

6. A device of the class described comprising a thermostatic switch and means for adjusting it, a member movably mounted, and having a contact, a second contact engageable with the first as a result of motion of said adjusting means, said movable member having a pair of stops between which the second contact operates as a lost motion connection to move the movably mounted member in one direction and obtain a closed circuit relation of said contacts and to move the member in the opposite direction to obtain an open circuit relation of the contacts.

7. A device of the class described, comprising, in combination, switching means, a thermostatic element in control thereof, movable adjusting means associated with the switching means and thermostatic element for changing the temperature at which the former is operated by the latter, an auxiliary control device adjacent the switching means, and a non-positive connection between the auxiliary control device and adjusting means for controlling the auxiliary control device in a predetermined relation to the direction of movement of the adjusting means.

8. A device of the class described comprising, in combination, switching means, a thermostatic element in control thereof, movable adjusting means associated with the switching means and thermostatic element for changing the temperature at which the former is operated by the latter, a second switching means, and a non-positive connection between the adjusting means and the second switching means whereby the second switching means is moved to new control positions upon initial reverse movements of the adjusting means.

9. A device of the class described comprising switching means movable with an adjustable member, a thermostatic element in control of said switching means, movable auxiliary control means, and yielding means by which the adjusting member moves and controls said auxiliary control means in predetermined relation to the direction of motion of said movable adjusting member, and maintains such relation during continued motion in the same direction.

10. A device of the class described comprising a thermostatic element fixed at one end and having a movable contact at its other end, a second contact cooperable therewith, a movable member carrying the said second contact and by which the setting of the device may be adjusted, an auxiliary switch, and means connecting the said auxiliary switch with the movable member in such manner that the auxiliary switch is operated upon movement of the said movable member.

11. A device of the class described comprising a thermostatic element fixed at one end and having a movable contact at its other end, a second contact cooperable therewith, a movable member carrying said second contact by means of which the setting of the device may be adjusted, auxiliary switching means including a member frictionally pivoted so that some force is necessary to move it about its pivot but so that it will maintain any adjusted position unless such force is applied, and means by which said movable member obtains opening or closing of the auxiliary switch and maintains such open or closed condition on continued motion of the movable member in the same direction.

12. A device of the class described comprising a thermostatic element fixed at one end and having a movable contact at its other end, a second contact cooperable therewith, a movable member carrying said second contact by means of which the setting of the device may be adjusted, an auxiliary switch including one contact frictionally pivoted so that some force is necessary to move it about its pivot but so that it will maintain any adjusted position unless such force is applied, and another contact movable by said movable member and so related to its companion contact that on slight motion in either direction, the auxiliary switch is opened or closed and maintained in such open or closed position on continued motion of the movable member in the same direction.

In witness whereof, I have hereunto set my hand this 20th day of July 1931.

GEORGE D. KINGSLAND.